(12) United States Patent
Comper

(10) Patent No.: US 7,379,825 B2
(45) Date of Patent: May 27, 2008

(54) MULTIFUNCTIONAL ELECTRONIC DEVICE FOR A MECHANICAL SEAL AND CONTROL AND MANAGEMENT PROCESS REALISED BY SUCH DEVICE

(75) Inventor: Riccardo Comper, Azzano S. Paolo (IT)

(73) Assignee: Termoelettronica, S.p.A., Azzano S. Paolo (IT)

( * ) Notice: Subject to any disclaimer, the term of this patent is extended or adjusted under 35 U.S.C. 154(b) by 706 days.

(21) Appl. No.: 10/519,124

(22) PCT Filed: Mar. 12, 2003

(86) PCT No.: PCT/IT03/00154

§ 371 (c)(1),
(2), (4) Date: Dec. 21, 2004

(87) PCT Pub. No.: WO04/001259

PCT Pub. Date: Dec. 31, 2003

(65) Prior Publication Data

US 2005/0251541 A1 Nov. 10, 2005

(30) Foreign Application Priority Data

Jun. 25, 2002 (IT) .......................... MI2002A1396

(51) Int. Cl.
*G01B 3/00* (2006.01)
(52) U.S. Cl. ........................................ 702/33; 277/304
(58) Field of Classification Search .................. 702/33; 277/304
See application file for complete search history.

(56) References Cited

U.S. PATENT DOCUMENTS

| | | | |
|---|---|---|---|
| 4,792,911 A | 12/1988 | Gonzalez et al. | 364/551.02 |
| 5,746,435 A * | 5/1998 | Arbuckle | 277/304 |
| 5,762,342 A | 6/1998 | Kakabaker et al. | 277/306 |
| 6,116,609 A | 9/2000 | Azibert | 277/388 |

FOREIGN PATENT DOCUMENTS

WO  WO 01/40756 A2  6/2001

\* cited by examiner

*Primary Examiner*—John E Barlow, Jr.
*Assistant Examiner*—Stephen J Cherry
(74) *Attorney, Agent, or Firm*—David A. Farah; Sheldon Mak Rose & Anderson PC

(57) ABSTRACT

A multifunctional electronic device for checking and managing the operating and diagnostic conditions of a mechanical seal. A method of controlling and managing the operating and diagnostic conditions of a mechanical seal.

24 Claims, 6 Drawing Sheets

MULTIFUNCTIONAL ELECTRONIC DEVICE FOR A MECHANICAL SEAL AND CONTROL AND MANAGEMENT PROCESS REALISED BY SUCH DEVICE

CROSS-REFERENCE TO RELATED APPLICATIONS

The present Application is a national phase application of International Patent Application PCT/IT2003/000154, titled "Multifunctional Electronic Device for a Mechanical Seal and Control and Management Process realized by Such Device," filed Mar. 13, 2003; which claims the benefit of Italian Patent Application MI2002A001396, titled "Dispositivo Elettronico Multifunzionale per una Tenuta Meccanica e Procedimento di Controllo e Gestione realizzato da Detto Dispositivo," filed Jun. 25, 2002; the contents of which are incorporated in this disclosure by reference in their entirety.

BACKGROUND

Mechanical seals are structures designed to prevent leakage of gas or liquid between a rotating shaft and its housing, thereby causing injuries or damaging the environment. Mechanical seals are used in a variety of machines, including compressors, driers, mixers, pressure-filters, pumps, reactor stirrers, rotating shafts and separators.

Mechanical seals generally comprise two coupled surfaces or rings, a rotating one integral with a shaft and a stationary one integral with the machine in which the shaft is inserted. The rotating surface or ring and the stationary surface or ring are kept in contact by two combined forces: a mechanical force generated by springs and a hydraulic force generated by fluid pressure. The two surfaces or rings slide against one another under compression and the compression forces are calculated when designing the mechanical seal.

Mechanical seals are designed to work without significant leakage, and the efficiency, productivity and safety of the machine comprising the mechanical seal depends on the integrity and proper functioning of the mechanical seals. Concerns for human injury and environmental damage have led to research to produce more reliable, and better performing mechanical seals.

There are a large variety of types of mechanical seals available, including individual, double, balanced and unbalanced mechanical seals, and mechanical seals designed to operate under dry conditions, with liquid, under combined dry-lubricated-dry conditions, under sterile conditions, and in the presence of high temperatures. Double dry-operating mechanical seals and mechanical seals designed to operate with liquid are generally considered to be the mechanical seals most prone to failure. Further, the problems leading to failure associated with these two types of mechanical seals generally encompass the problems with all other types of mechanical seals.

In general, the primary conditions that must be taken into account when designing or selecting a mechanical seal for a particular application are the pressure to which the mechanical seal will be exposed, the flowing, the manner in which the environment of the mechanical seal will be monitored to assure its proper functioning, and the manner in which the integrity of the mechanical seal is ascertained.

Generally, pressurization is performed with nitrogen or compressed air. Many mechanical seal manufacturers also recommend that the dry-operating mechanical seals be exposed to a flowing to keep the mechanical seal parts cool, clean and lubricated. The flow-rate is usually independent of the set pressurization value.

By contrast, mechanical seals operating with liquid utilize a hydraulic circuit to pressurize the seal, and to circulate a suitable hydraulic circuit fluid within the seal. The hydraulic circuit fluid must be compatible both with the materials the mechanical seal comprises, and with the chemical and physical environment inside the machine containing the mechanical seal, because the hydraulic circuit fluid could come in contact with the rest of the machine if the mechanical seal fails. The hydraulic circuit fluid is usually circulated by a pump, or through a siphon system that exploits the temperature differences. The hydraulic circuit fluid tank containing the hydraulic circuit fluid is usually pressurized with a nitrogen or compressed air head.

Mechanical seal manufacturers generally recommend a pressurization of approximately between 0.5 and 1 bar greater than the process pressure (the pressure inside the machine containing the mechanical seal), for both dry seals and liquid-pressurized seals.

Currently, the functional, diagnostics (if present) and control aspects of a mechanical seal are partly implemented with manual regulators and partly implemented with automatic regulators or regulators coupled with automated systems which control the whole production plant in which the machine containing the mechanical seal is installed. The disadvantages of such implementation is well known to those with skill in the art. For example, manual regulators systems which control flow-rate are generally inaccurate, not subject to feed-back control and do not continuously verify the flow-rate, even though an insufficient flow-rate causes non-optimum mechanical seal cooling and lubrication, thereby reducing the service life of the mechanical seal and increasing its maintenance costs, and an excessive flow-rate causes fluid waste, and can lead to seal failure and environmental damage.

Additionally, mechanical seal pressurization pressure is usually set at a constant value during plant design or at startup, and determined by the maximum pressure that can be reached during the operation of the machine or the maximum design pressure of the machine in which the mechanical seal is installed. Setting the pressurization pressure at a constant value greatly simplifies installation and configuration of a circuit to regulate the flowing flow-rate. Unfortunately, the internal pressure of many machines containing mechanical seals varies over a wide range from near vacuum to overpressure conditions. Therefore, using a mechanical seal having a pressurization pressure set at a constant prefixed, maximum allowable pressure, though simplifying its installation, causes the mechanical seal to operate optimally only part of the time, and can result in premature failure of the mechanical seal.

For example, in filter/drier machines designed for solid-liquid separation and drying, the pressure inside the machine can vary from a near vacuum during drying, which can take several hours, to pressures as high as 4 bars during filtering and squeezing, which can take as little as tens of minutes. Therefore, a mechanical seal pressurization pressure of at least about 4.5 bars is required in such machines if the pressurization pressure is set at a constant value. During drying, the mechanical seal rings of a filter/drier machine left pressurized at 4.5 bars must support a load of 5.5 bars (4.5 bars overpressure plus 1 bar vacuum), neglecting the component due to springs, instead of 0.5 bars recommended by a typical manufacturer. Leaving the mechanical seal constantly pressurized at such high pressures, however, even when not required by the internal pressure of the machine, causes increased wear on the mechanical seal and decreases the service life of the mechanical seal.

Additionally, pump or machine efficiency, productivity and safety depends on the integrity of its mechanical seals, and mechanical seal failure can cause leakage that damages the environment, and interferes with plant certification. Currently, the integrity of mechanical seals are generally checked by automated systems to avoid operator errors created by manual systems, and are regularly checked during the normal plant operation. Current automated systems for checking mechanical seal integrity are based on monitoring on/off transducers, such as flow-meters and level switches. Disadvantageously, however, such automated systems have been proven adequate only for detecting macroscopic leakage.

Further, mechanical seals are subject to routine wear and, therefore, require periodic maintenance and replacements. Generally, a mechanical seal is replaced based on the service life determined by reference to its installation date or its last maintenance date. Disadvantageously, however, determining service life in this manner does not give an accurate reflection of the actual wear of the mechanical seal.

Additionally, the manufacturer's warranty for mechanical seals requires that the mechanical seal be installed and used according to set criteria. When a mechanical seal fails during the warranty period, there is often a dispute between the manufacturer and the end user over whether the mechanical seal was installed and used properly.

Therefore, there is a need for improvement in mechanical seal technology that addresses these problems.

SUMMARY

According to one embodiment of the present invention, there is provided a device for checking and managing the operating and diagnostic conditions of a mechanical seal in a machine. The device automatically and continuously regulates a first pressure inside the mechanical seal depending on a second measured pressure in the machine in order to keep constant an optimum difference between the first pressure and the second pressure. The device comprises a) one or more than one pressure regulator operatively connected on one side to a pressurization line and on another side to a supply line for a fluid for the mechanical seal; b) one or more than one transducer which detects a measured value of the first pressure in the mechanical seal; c) one or more than one converter which drives the pressure regulator; and d) one or more than one microprocessor, the microprocessor running a regulating algorithm for the converter, the pressure regulator and the one transducer. The regulating algorithm enables the device to perform one or more than one of the following functions: i) regulating the first pressure in the mechanical seal detected by the transducer and the second pressure in the machine by comparing the first pressure with a desired pressure setpoint value, the setpoint value being the sum of the second pressure and an optimum set pressure difference recommended by a manufacturer of the mechanical seal; ii) regulating a flow-rate of the mechanical seal; iii) checking the integrity of the mechanical seal based on detection and evaluation of actual pressure leakage; iv) checking for anomalies in the mechanical seal; v) counting operating hours of the mechanical seal; vi) displaying and recording data for the mechanical seal; and vii) interfacing with other apparata or automated systems.

In one embodiment, the pressure regulator comprises a 2-way proportional valve. In another embodiment, the pressure regulator comprises a 3-way proportional valve. In one embodiment, the transducer is adapted to measure the pressure in the pressurization line output from the device and the pressure inside the mechanical seal. In another embodiment, the regulating algorithm controls the pressure regulator. In one embodiment, the device further comprises a minimum pressure switch for generating a low pressure alarm, the minimum pressure switch connected between the pressure regulator and the fluid supply line. In another embodiment, the device further comprises means for counting the operating hours of the mechanical seal. In a preferred embodiment, the means for counting the operating hours of the mechanical seal perform the counting depending on the mechanical seal pressurization pressure and the pressure inside the machine. In one embodiment, the device further comprises means for receiving an output signal allowing other apparata to monitor the operation of the device. In another embodiment, the device further comprises a display and a keyboard for changing operating parameters and for displaying past and present data, and comprises a mass storage for recording the data. In a preferred embodiment, the mass storage is a solid-state mass storage.

According to another embodiment of the present invention, there is provided a device for regulating the pressure inside of a mechanical seal comprising means for regulating the pressure inside of the mechanical seal, where the means for regulating maintain an optimum pressure difference between pressure inside the mechanical seal and pressure inside a machine in which the mechanical seal is installed. According to another embodiment of the present invention, there is provided a method of controlling and managing the operating and diagnostic conditions of a mechanical seal. The method comprises a) providing a device according to the present invention; b) connecting the device to the mechanical seal; and c) activating the device, thereby controlling and managing the operating and diagnostic conditions of the mechanical seal.

According to another embodiment of the present invention, there is provided a method of regulating the pressure inside of the mechanical seal. The method comprises a) providing a device according to the present invention; b) connecting the device to the mechanical seal; and c) activating the device, thereby regulating the pressure inside of the mechanical seal.

According to another embodiment of the present invention, there is provided a method of controlling and managing the operating and diagnostic conditions of a mechanical seal. The method comprises a) an activation step; b) an operation enabling checking step; c) an anomalies checking step resulting in the detection of anomalies or the detection of no anomalies, and performed only in case of positive result in step b); d) an integrity control request checking step performed only in case of no anomalies detected in step c); e) a pressure regulating step performed only in case of negative check in step d); f) a flowing need checking step; g) a flow-rate regulating step bypassed in case of negative check in step f); h) an operating hours counting step, i) a data displaying and recording step; j) an interfacing step with other systems; and k) repeating steps b) through j). In one embodiment, the method additionally comprises the following steps in case of a negative check in step b): l) a configuration modify request checking step; m) a system reconfiguring step bypassed in case of negative check in step l); n) a command resetting step; o) a data displaying and recording step; and p) an interfacing step with other systems. In another embodiment, the method additionally comprising the following steps in case of a positive check in step d): q)

an integrity checking step; r) an alarm managing step bypassed in case of no alarms detected in the step q); s) an operating hours counting step; t) a data displaying and recording step; and u) an interfacing step with other systems. In another embodiment, the method additionally comprises the following steps in case of the detection of anomalies in step c): v) an alarm managing step; w) an operating hours counting step; x) a data displaying and recording step; and y) an interfacing step with other systems.

FIGURES

These and other features, aspects and advantages of the present invention will become better understood with regard to the following description, appended claims, and accompanying figures where:

DESCRIPTION

Figure 1:
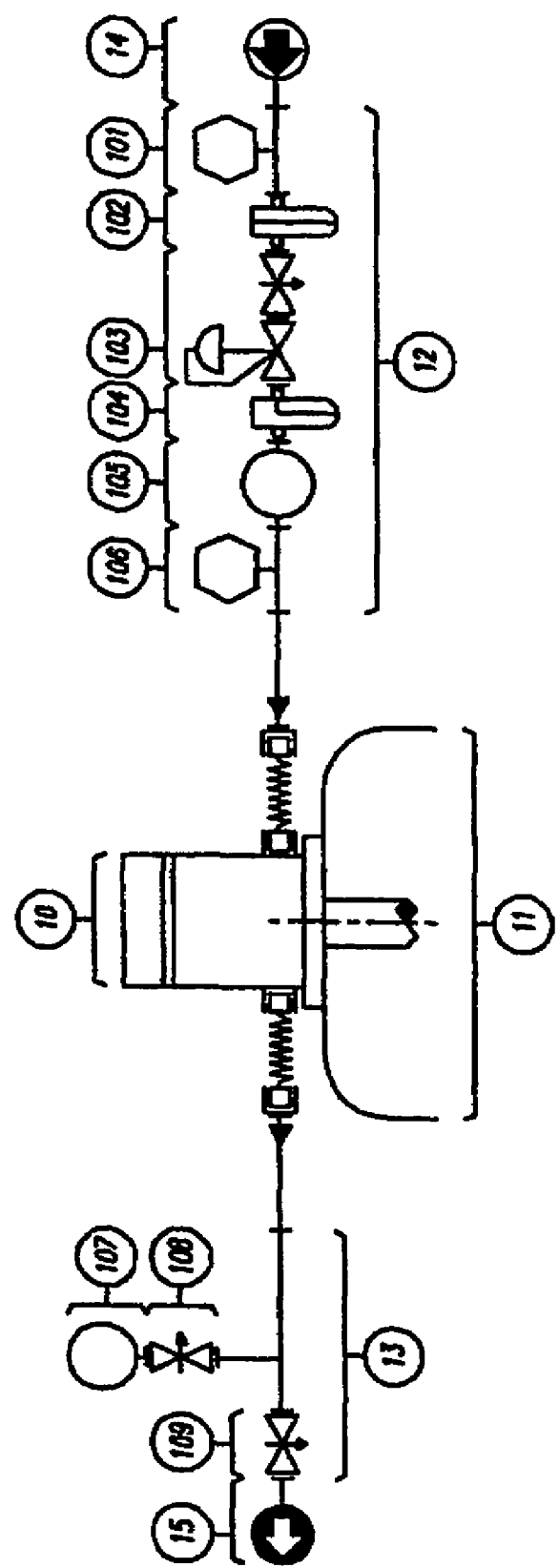
FIG. 1 is a schematic diagram of an installation, according to the prior art, comprising a dry-operating mechanical seal assembled on a machine.

According to one embodiment of the present invention, there is provided a multifunctional electronic device for checking and managing the operating and diagnostic conditions of a mechanical seal. According to another embodiment of the present invention, there is provided a method of controlling and managing the operating and diagnostic conditions of a mechanical seal. In one embodiment, the method comprises providing a device according to the present invention. The device can be used with all mechanical seals that require pressurization, such as the mechanical seals commonly used in the chemical, food, petrochemical, pharmaceutical and textile industries.

The device is used in connection with mechanical seals that comprise two coupled surfaces or rings, a rotating one integral with a shaft and a stationary one integral with the machine in which the shaft is inserted. The rotating surface or ring and the stationary surface or ring are kept in contact by two combined forces: a mechanical force generated by springs and a hydraulic force generated by fluid pressure and controlled by a pressure regulator.

The device of the present invention simplifies the installation and use of a mechanical seal, while optimizing the operating conditions for the mechanical seal, thereby decreasing mechanical seal failure rate, by centralizing all functions under the control of a single microprocessor. In its various embodiments, the device also allows automated checking, using the microprocessor, of all operating and diagnostic conditions of a mechanical seal by a single device, including 1) automatically and continuously regulating the pressurization of the mechanical seal to variable pressure values; 2) automatically and systematically checking all operating conditions, including pressure and flow; 3) automatically and systematically checking mechanical seal integrity based on actual pressure leakage; 4) automatically counting actual operating hours of the mechanical seal; 5) permitting certification and validation of operating and diagnostic conditions; and 6) permitting interfacing or connections with other apparata or automated systems. These attributes will now be discussed more specifically.

The device automatically and continuously regulates the pressure inside of a mechanical seal, maintaining a constant and optimum pressure difference between pressure inside the mechanical seal and pressure inside the machine in which the mechanical seal is installed. Unlike prior mechanical seal pressure regulation, the present device takes into account the pressure difference between pressure inside the mechanical seal and the pressure inside the machine in which the mechanical seal is installed in controlling mechanical seal pressurization.

In another embodiment, the device continuously and accurately regulates the mechanical seal flow-rate, also with variable pressure values depending on the pressure inside the machine in which the mechanical seal is installed to accurately and reliably correct any deviations from the actual flow. In a preferred embodiment, this function is accomplished using a series of different precision nozzles that are pre-calibrated and automatically selected by the microprocessor depending on the current pressurization value and on the setpoint value for the flow-rate recommended by the mechanical seal manufacturer. This regulation allows optimal cooling and lubrication of the mechanical seal, thereby extending its service life and reducing maintenance costs.

In another embodiment, the device automatically and systematically checks mechanical seal integrity based on actual pressure leakage by performing a pressurization and stand-by sequence which detects and evaluates possible overpressure leakage. The present invention is capable of detecting micro-leakage, which can interfere with mechanical seal function and cause environmental damage. Moreover, unlike prior art methods which use on/off transducers to check mechanical seal integrity, the present device uses analog components which allows the determination of variations in leakage over time, thereby permitting the institution of preventive maintenance.

In another embodiment, the device automatically counts actual operating hours of the mechanical seal, records them and classifies them, depending on the mechanical seal pressurization pressure and the pressure inside the machine in which the mechanical seal is installed. Such information can be used to schedule maintenance of the mechanical seal.

In another embodiment, the device records and maintains the record of data on all alarms, anomalies, operating hours and conditions, and operating and diagnostic parameters. Such data can document and certify the service life and use of the mechanical seal, and thus permit independent certification of the operating hours and uses, failures and any other relevant occurrences. When a mechanical seal fails during the warranty period, the data can be used to settle a dispute between the manufacturer and the end user over whether the mechanical seal was installed and used properly. These data can be used to make objective comparisons between different technologic solutions and the efficiency of various preventive maintenance programs.

The device can be connected to other apparata or automated systems, permitting easy integration in an automated system or distributed control structure. The device will now be disclosed in greater detail.

Referring now to FIG. 1, there is shown a schematic diagram of an installation, according to the prior art, comprising a dry-operating mechanical seal 10 assembled on a machine 11. The mechanical seal 10 is pressurized through a pressurization line 12, generally using nitrogen or compressed air as pressurization gas 14. The pressurization line 12 comprises, sequentially from the pressurization gas 14 to the mechanical seal 10, a minimum pressure switch 101, a filter 102, a pressure regulator 103, a humidifier 104, a flow indicator 105 and a maximum flow-meter 106. As shown in FIG. 1, the mechanical seal 10 is also connected to a return line 13 that comprises a manual valve 109, a manometer 107, and an on-off valve 108 coupled to the manual valve 109 and between the manual valve 109 and the manometer 107. The on-off valve 108 is used only during maintenance and is kept open during normal operations of the machine 11. The return line 13 is vented through a vent 15.

The minimum pressure switch 101 is optional and generates an alarm when there is insufficient pressurization gas 14 for pressurizing the mechanical seal 10. The response to such an alarm is usually controlled by an automated system in the plant where the mechanical seal 10 is installed. Such automated systems can be based on PLC (Programmable Logic Computers), on PC (industrial computers) or on DCS (Distributed Control Systems), as will be understood by those with skill in the art with reference to this disclosure.

The filter 102, humidifier 104, manometer 107 and on-off valve 108 are also optional. The pressure regulator 103 is usually set manually during installation to a constant value, taking into account the maximum allowable pressure in the machine 11 and the pressure difference recommended by the manufacturer of the mechanical seal 10. The maximum flow-meter 106 is also optional and, when present, registers an alarm value when there is excessive fluid flow-rate in the pressurization line 12 from leakage through the mechanical seal 10. The response to such an alarm is also usually controlled by an automated system based on PLC, PC or DCS in the plant where the mechanical seal 10 is installed. The flow indicator 105 and manual valve 109 are used in case it is also required to set the flow-rate of the mechanical seal 10 during installation of the mechanical seal. The manual valve 109 is kept closed during installation of the mechanical seal 10 to obtain the desired flow-rate, at the pressure set by the pressure regulator 103 as recommended by the manufacturer, and as verified by reference to the flow indicator 105.

Figure 2:
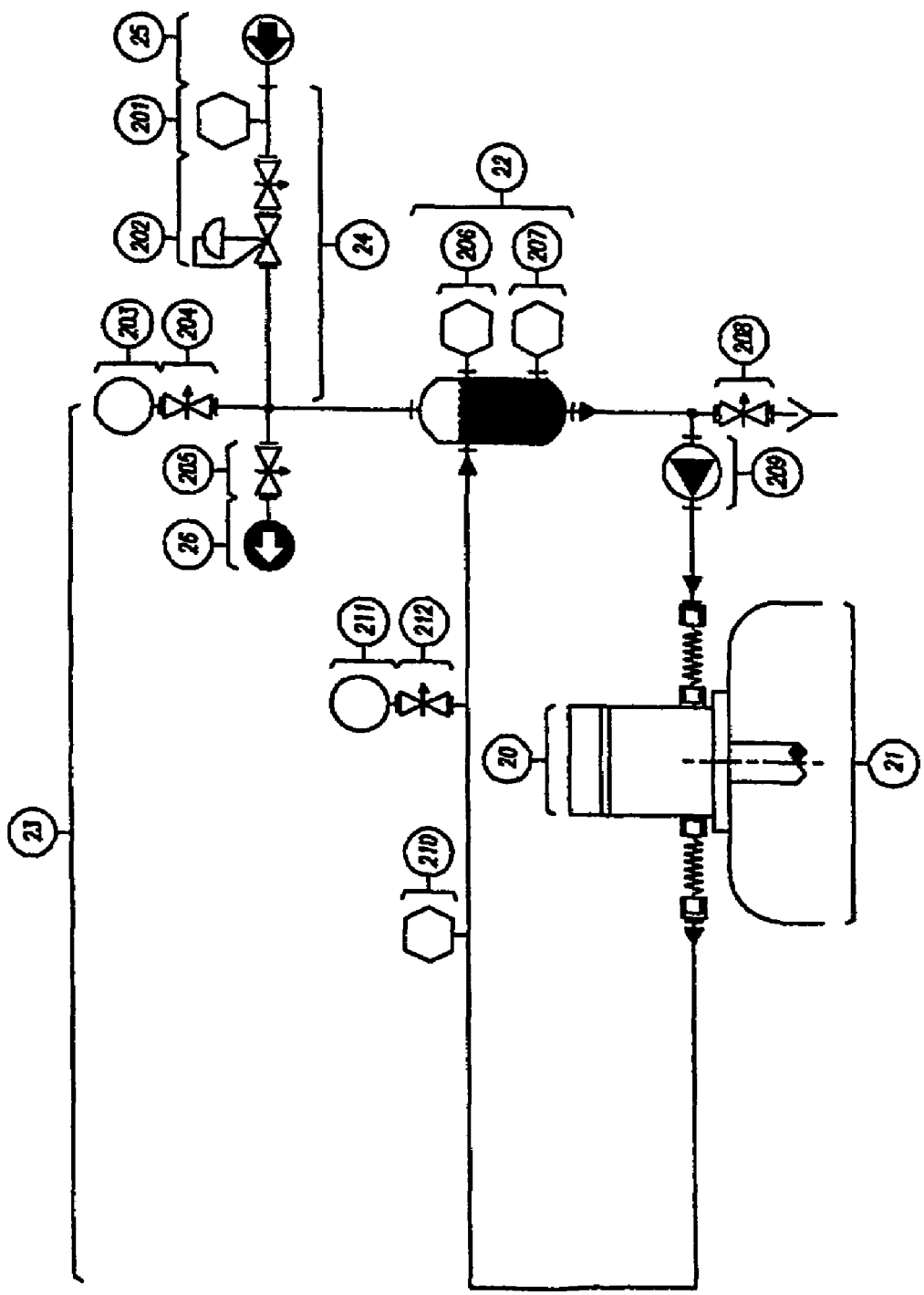
FIG. 2 is a schematic diagram of an installation, according to the prior art, comprising a dry-operating mechanical seal operating with liquid assembled on a machine.

Referring now to FIG. 2, there is shown a schematic diagram of an installation, according to the prior art, comprising a mechanical seal 20 operating with liquid as assembled on a machine 21. As can be seen, the installation further comprises a hydraulic circuit 23 connected to a liquid tank 22 containing a suitable liquid. A pump 209, or alternatively a siphon system (not shown), re-circulates liquid through the mechanical seal 20. The circulation flow-rate is measured by a minimum flow-meter 210. The liquid tank 22 of the hydraulic circuit 23 is pressurized with a head 25, usually containing nitrogen or compressed air, through a pressurization line 24. The pressurization line 24 comprises a pressure regulator 202 connected to a minimum pressure switch 201. A minimum level switch 206 and a maximum level switch 207 are connected to the liquid tank 22. A manometer 203 and a suitable on-off valve 204 are connected to the liquid tank 22 from above. The liquid tank 22 is also connected to a vent line 26 through a manual valve 205, as shown.

In the installation shown in FIG. 2, the hydraulic circuit 23 can be drained through a manual valve 208. The manual valves 205 and 208 are used only during maintenance and are kept closed during normal operations of the machine 21. A manometer 211, equipped with an on-off valve 212, displays the hydraulic circuit pressure. The on-off valves 204 and 212 are used only during maintenance and are kept open during normal operations of the machine 21. The minimum pressure switch 201 is optional and generates an alarm when there is insufficient fluid 25 for pressurizing the mechanical seal 10. The response to such an alarm is also usually controlled by an automated system based on PLC, PC or DCS in the plant where the mechanical seal 20 is installed. The pressure regulator 202 is usually set manually during installation to a constant value, taking into account the maximum allowable pressure in the machine 21 and the pressure difference recommended by the manufacturer of the mechanical seal 20 and possibly also the circulating pump 209 head. The manometers 203 and 211, with their respective on-off valves 204 and 212, are optional. The minimum level switch 206 is also optional and, when present, generates an alarm when there is an excessive lowering of the liquid level in the tank 22 from leakage through the mechanical seal 20. The minimum level switch 206 is also optional and functions to stop the pump 209 operation when there is an excessive lowering of the liquid level in the tank 22 from leakage through the mechanical seal 20. The minimum flow-meter 210 is also optional and is used to monitor flow in the hydraulic circuit 23 when the pump 209 is operating. Signals from minimum pressure switch 201, minimum level switch 206, maximum level switch 207, circulation pump 209 and minimum flow-meter 210, when present, are usually controlled by an automated system based on PLC, PC or DCS in the plant where the mechanical seal 20 is installed.

Figure 3:
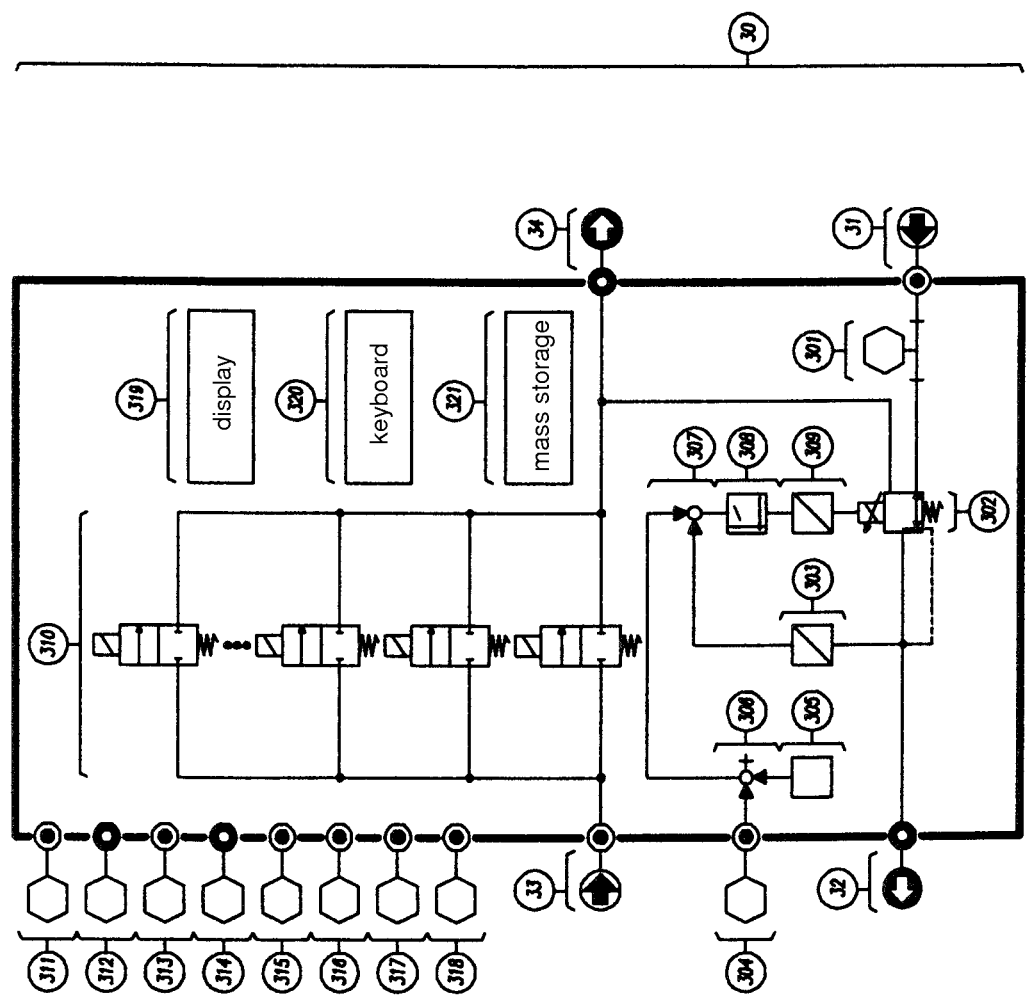
FIG. 3 is a schematic diagram of a multifunctional electronic device, according to one embodiment of the present invention, for checking and managing the operating and diagnostic conditions of a mechanical seal.

Referring now to FIG. 3, there is shown a schematic diagram of a multifunctional electronic device, according to one embodiment of the present invention, for checking and managing the operating and diagnostic conditions of a mechanical seal. As can be seen, the electronic device 30 is supplied with nitrogen, compressed air or a suitable fluid by a pressure line 31. The electronic device 30 is connected to the mechanical seal 10 (as shown in other figures) through the pressurization line 32. The pressure in line 32 is controlled by a pressure regulator 302, preceded by a minimum pressure switch 301. The pressure regulator 302 is driven by a suitable converter 309 that receives commands from a regulating algorithm 308 (PID or another type). The regulating algorithm 308 receives data from a comparator 307 that compares a desired value (the "setpoint"), which is the output from block 306, with a measured value, which is the output from transducer 303. The setpoint is computed with summation block 306 by adding the process pressure detected by a pressure transmitter 304 to the optimum pressure difference 305 set or by following the recommendation of the manufacturer of the mechanical seal. The measured value is instead detected by a transducer 303. The regulating algorithm 308 can also be temporarily disabled by the microprocessor controlling the device 30, thereby allowing a fixed configuration of the pressure regulator 302 independent from the desired value and measured output values from block 307. In other words, the regulating algorithm 308 can be disabled, providing a fixed configuration of the pressure regulator 302 that does not take into account the output values on which the above regulation is performed, because as will be understood by those with skill in the art with reference to this disclosure, in some applications, the regulating algorithm 308 is not necessary and the device 30 must be able to provide the user with the chance of disabling the features of the regulating algorithm.

In order to permit the flowing independently from the desired and measured values as output, the device 30 further comprises a return line 33 as input to the electronic device 30 coming from the mechanical seal and connected to a vent line 34 after a passage through a flow-rate regulator 310 (a flow-rate regulating element). In one embodiment, the flow-rate regulator 310 comprises a multivalve that has a series of precision nozzles that are pre-calibrated and mutually arranged in parallel. The flow-rate is predetermined for every possible pressure value for every nozzle. The microprocessor controlling the electronic device 30 drives the opening or closing of the nozzles depending on the variable pressure measurement detected by the transducer 303, and the desired value of the flow-rate. In another embodiment (not shown), the flow-rate regulator 310 is replaced with a 2-way proportional valve fed-back by a flowmeter.

Therefore, the electronic device 30 creates a circuit comprising the pressurization line 32 going to the mechanical seal, and a return line 33 coming from the mechanical seal, when it is necessary to have a flowing independent of the desired and measured output values, thereby allowing an algorithm for checking the integrity of the mechanical seal based on the evaluation of actual pressure leakage from the mechanical seal. During the integrity check, preferably performed periodically and automatically, the nozzles of flow-rate- regulator 310 are temporarily closed, stopping flow, and the maximum pressure is set in the mechanical seal through the pressure regulator 302. Then, the regulating algorithm 308 is temporarily disabled, inhibiting the pressure regulator 302 and, thereby, preventing automatic compensation for a possible pressure leakage on the pressurization line 32. Next, the time variation of the pressure as measured by the transducer 303 is evaluated over a predetermined time. Any pressure leakage detected that is greater than a predetermined value and detected over a predetermined time generate an alarm situation. If no pressure leakage is detected that is are greater than a predetermined value and detected over a predetermined time, the mechanical seal is determined to be functioning properly. The electronic device 30 is programmed to automatically restore the usual prior pressure and flow-rate regulations, as previously described, if the mechanical seal is determined to be functioning properly by the integrity check.

In another embodiment, the electronic device 30 is capable of acquiring external signals coming from minimum level switches and flow-meters 316, 318 and maximum level switches and flow-meters 315, 317, when present, to allow the electronic device 30 to completely monitor alarms and malfunctions of the mechanical seal. In a preferred embodiment, the electronic device 30 is also designed to manage other external input and output signals, necessary or useful for implementing further functionalities and for integrating with other control systems. For example, an input signal 311, which recognizes when the mechanical seal must be operating, allows the electronic device 30 to automatically activate the operating and diagnostic conditions of the mechanical seal, in addition to tracking and recording the actual operating time of the mechanical seal. An output signal 312, which signals the existence of alarm situations, and an input signal 313, which remotely recognizes and resets alarm or lock situations, allow integration with other equipment, commands and control actions of the electronic device 30. An output signal 314, a "Watch Dog" contact, and a frequency pulse output allows for other equipment to monitor the correct operation of the electronic device 30.

In one embodiment, the electronic device 30 further comprises a display 319 and a keyboard 320 for changing operating parameters and for displaying past and present data, and comprises a solid-state mass storage 321 for recording the data. The minimum pressure switch 301 generates an alarm when the pressure decreases below the minimum pressure necessary for pressurization. In one embodiment, the pressure regulator 302 comprises a 3-way proportional valve. In another embodiment, the pressure regulation 302 comprises two integrated 2-way proportional valves, one to increase pressure in output line 32 through a divided connection to line 31, and the other to decrease pressure through a divided connection to vent 34. The transducer 303 measures the output pressure in the line 32 from the electronic device 30 that, once installed, is assumed to correspond to the pressure inside the mechanical seal. The pressure transmitter 304 is able to detect the pump delivery line pressure or the pressure inside the machine in which the mechanical seal is assembled. The block 306 adds the process pressure determined by the pressure transmitter 304 with the optimum pressure difference 305. The comparator 307 compares the setpoint value, output from the block 306, with the pressure value inside the mechanical seal measured by the transducer 303. The regulating algorithm 308, depending on the proportional, integral or derivative (or of other types) component of the error between measure and setpoint, determines how the pressure regulator 302 is controlled. The converter 309 electrically drives the pressure regulator 302.

After connection of line 32 to the mechanical seal, the electronic device 30 of the present invention, through components 302, 303, 304, 305, 306, 307, 308 and 309, keeps the pressure of the pressurization line 32 detected by the transducer 303, that is the pressure in the mechanical seal, regulated to a value depending on process pressure detected by the pressure transmitter 304, that is the pressure inside the machine in which the mechanical seal is installed, thereby guaranteeing an optimum pressure difference 305 as recommended by the mechanical seal manufacturer. The possible flowing is instead regulated by driving the flow-rate regulator 310 depending on the current pressure detected by the transducer 303.

During the integrity check of the mechanical seal, the above elements are instead temporarily managed according to a different control logic as already described: flowing disabling, pressurization, pressure regulation disabling and following pressure leakage evaluation. The elements 31, 33, 304, 311, 313, 315, 316, 317 and 318 are inputs to the electronic device 30. The elements 32, 34, 312 and 314 are outputs from the electronic device 30. The components 301, 302, 303, 304, 305, 306, 307, 308, 310, 311, 312, 313, 314, 315, 316, 317, 318, 319, 320 and 321 are directly controlled and managed by the electronic device 30 microprocessor through the control and management process shown in FIG. 6 and explained below.

Figure 4:
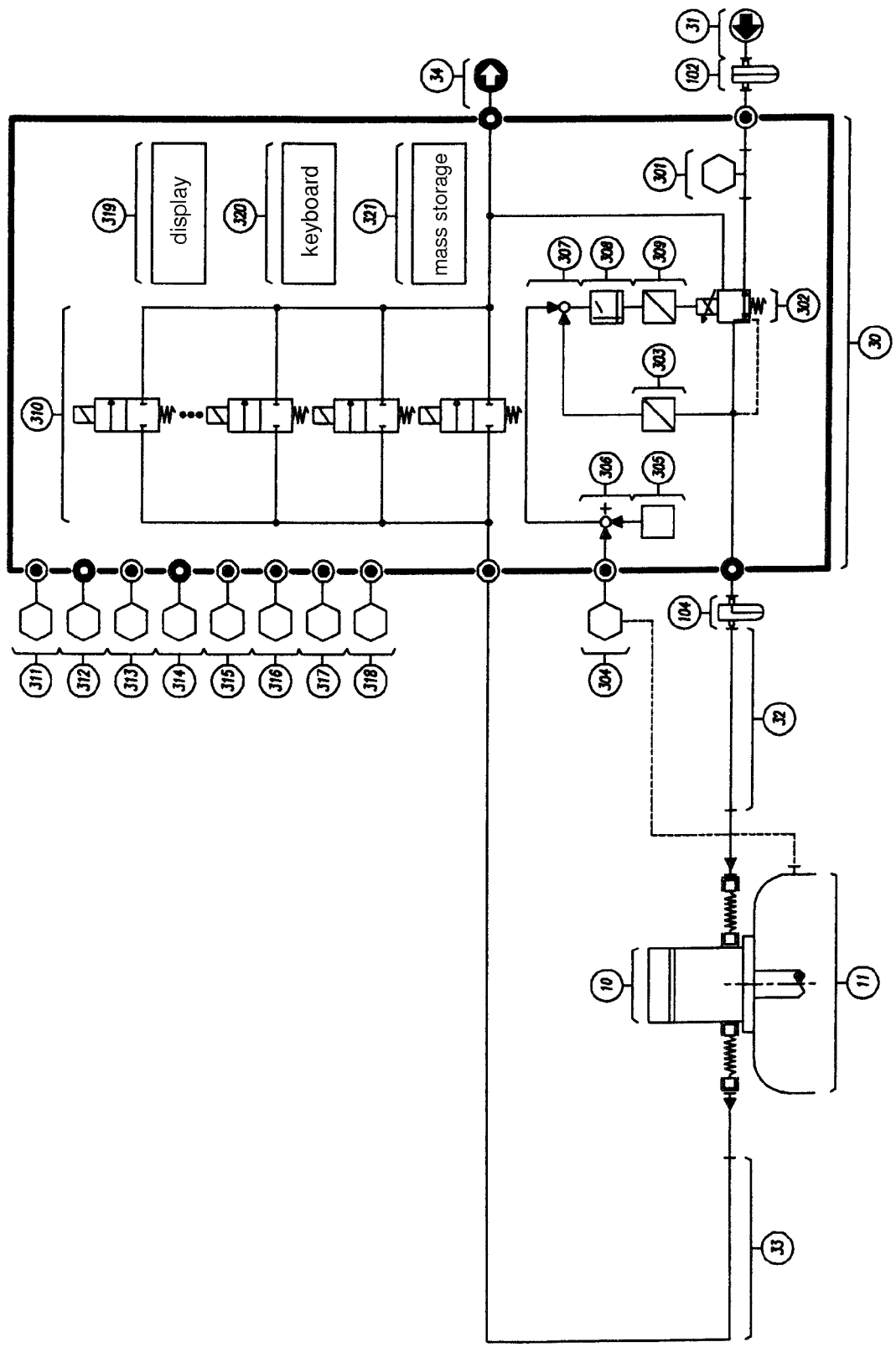
FIG. 4 is a diagram of one example of an electronic device, according to the present invention, being used in combination with a dry-operating mechanical seal, and assembled on a machine.

Referring now to FIG. 4, there is shown a diagram of one example of an electronic device 30, according to the present invention, being used in combination with a dry-operating mechanical seal 10, and assembled on a machine 11. Methods of installation and use of the device 30 will be understood by those with skill in the art with reference to FIG. 4, in addition to FIGS. 1 and 3, and to this disclosure. In this example, the components 315, 316 and 318 are not used because the application being depicted is with a dry-operating mechanical seal.

Figure 5:
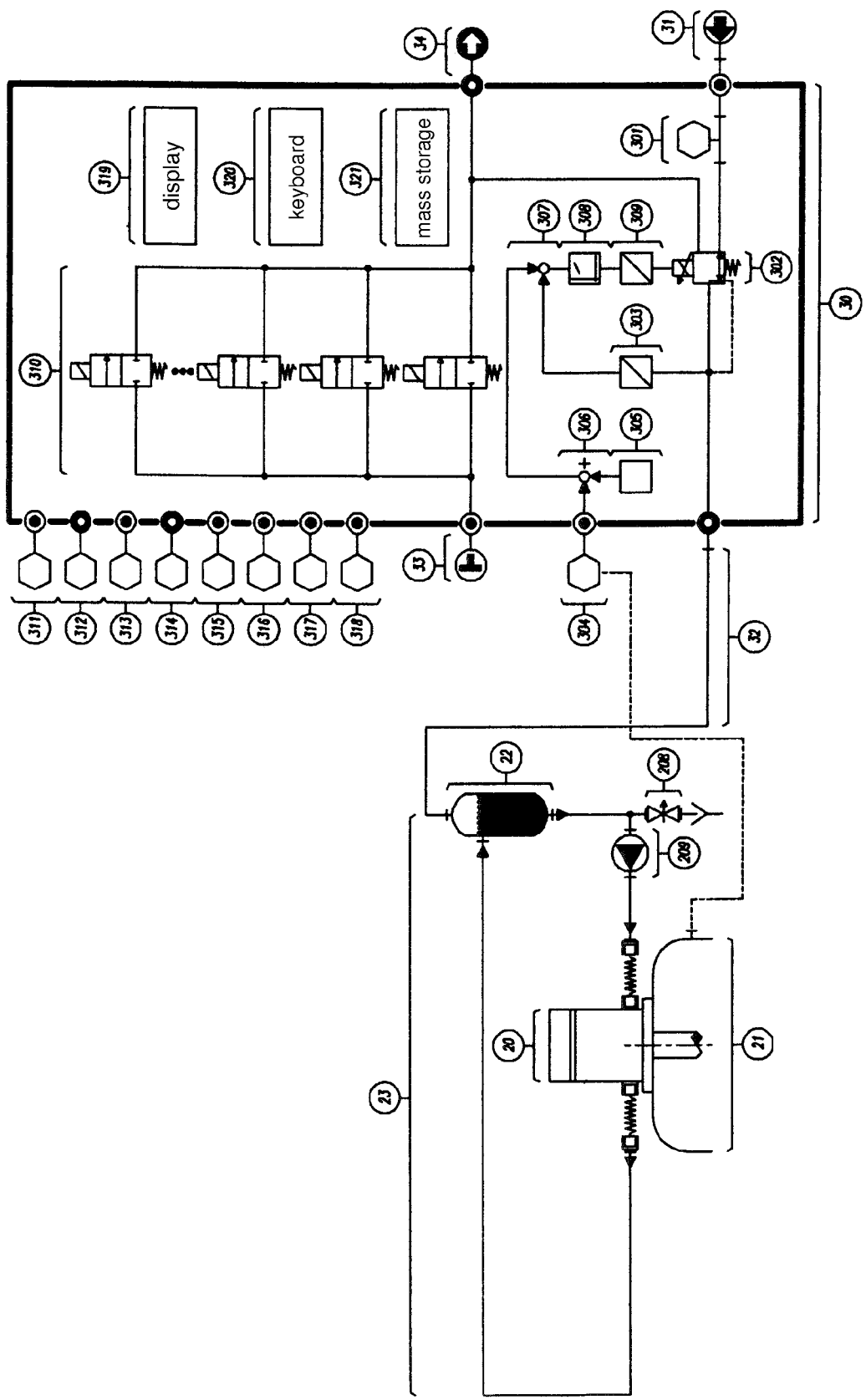
FIG. 5 is a diagram of one example of an electronic device, according to the present invention, being used in combination with a liquid-operating mechanical seal, and assembled on a machine.

Referring now to FIG. 5, there is shown a diagram of one example of an electronic device 30, according to the present invention, being used in combination with a liquid-operating mechanical seal 20, and assembled on a machine 21. Methods of installation and use of the device 30 will be understood by those with skill in the art with reference to FIG. 5, in addition to FIGS. 2 and 3, and to this disclosure. In this example, the components 310 and 317 are not used because the application being depicted is with a liquid-operating mechanical seal. In the embodiment shown in FIG. 5, the return line 33 is kept closed, since a gas pressurization is not required, as in dry applications.

Figure 6:
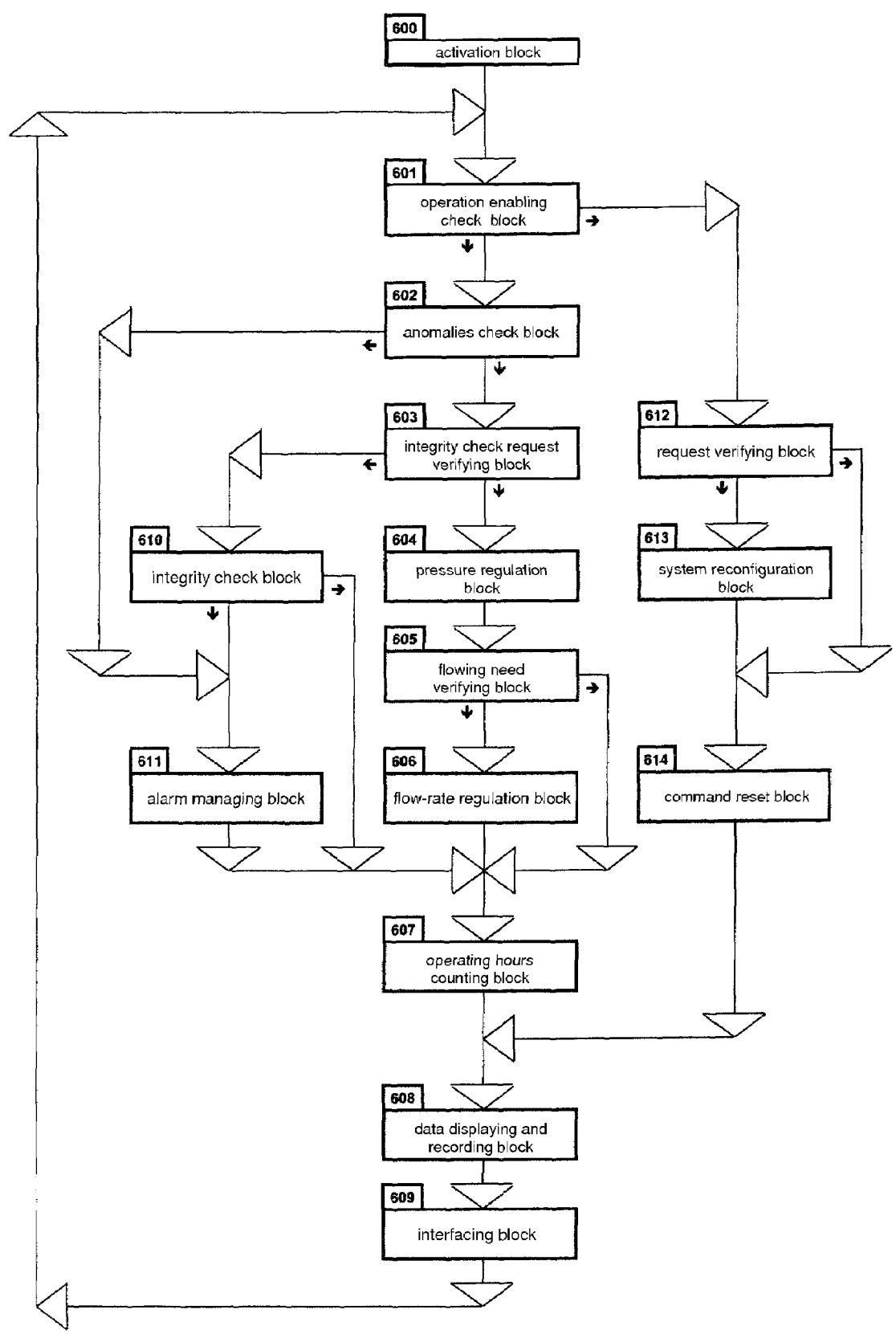
FIG. 6 is a schematic diagram of one example of a method, according to the present invention, of controlling and managing the operating and diagnostic conditions of a mechanical seal.

Referring now to FIG. 6, there is shown a schematic diagram of one example of a method of controlling and managing the operating and diagnostic conditions of a mechanical seal according to the present invention. In a preferred embodiment, the method comprises providing a device 30, according to the present invention. Reference is also made to FIG. 3 particularly, and the other portions of this disclosure for a better understanding of the present method.

As can be seen in FIG. 6, an activation block 600 of the device 30 is followed by an operation enabling check block 601. If the operation is enabled, the flow goes to an anomalies check block 602. If no anomalies are detected, an integrity check request verifying block 603 is reached. If the integrity check is not required, a pressure regulation block 604 is reached. From here the flow goes to a flowing need verifying block 605. If flowing is necessary, a flow-rate regulation block 606 is reached, otherwise this block 606 is bypassed. After block 606, the flow goes, in succession, to an operating hour counting block 607, to a data displaying and recording block 608 and to an interfacing block 609 with other possible systems, and then returns to go back to the operation enabling check block 601 (already mentioned). If the operation is not enabled, the flow instead goes to a configuration modify request verifying block 612 for the electronic device 30. If it is desired to modify the current configuration, a system reconfiguration block 613 is reached, otherwise this block 613 is bypassed and a command reset block 614 is directly reached. From here the flow returns to the data displaying and recording block 608 (already mentioned). If the seal integrity check from block 603 is requested, an integrity check block 610 is reached. If no leakage results in the mechanical seal, the operating hours counting block 607 (already mentioned) is reached. If instead, starting from anomalies checking block 602 (already mentioned) or integrity checking block 610 (already mentioned), alarms or anomalies are found, then an alarm managing block 611 is reached, from which the operating hours counting block 607 (already mentioned) is then reached.

In practice, when voltage is supplied to the electronic device 30 (switch-on block 600) a microprocessor starts automatically performing a cyclic program. In program block 601, a check is performed through the input signal 311 to verify that the mechanical seal is operating. If the answer is affirmative, block 602 is reached where possible anomalies are checked by monitoring signals coming from components 301, 315, 316, 317 and 318. If anomalies are detected, block 611 is reached for a correct management of any active alarms that brings about the appropriate driving and check of components 302 and 310 and signals 312 and 313. If, instead, there are no alarm conditions, block 603 is reached, in which, depending on system parameters that can be reconfigured in block 613, it is decided whether or not to perform the mechanical seal integrity check. The integrity check is performed periodically and alternates with normal pressurizing and flowing operations. The integrity check, performed in block 610, brings about, as already described, the mechanical seal pressurization to a maximum value and the following measure of possible pressure leakage. When a meaningful leakage is identified, the electronic device 30 automatically generates an alarm and goes to block 611. If the integrity check is not required, the program performs block 604 in which the mechanical seal pressure is regulated through components 302, 303, 304, 305, 306, 307, 308 and 309 as already described. The mechanical seal pressure, when the integrity check is not active, is then kept regulated to a greater value than an optimum difference 305 with respect to the process pressure detected by the pressure transmitter 304.

In block 605 a check is performed, depending on system parameters that can be reconfigured in block 613, to determine whether it is necessary to also perform a mechanical seal flowing, possibly performed in block 606 by suitably driving and controlling, as already described, the flow-rate regulator 310 (or, alternatively, the 2-way proportional valve) depending on the current pressure value detected by the transducer 303 and the desired flow-rate value made able to be reconfigured in block 613. Then, if operation of the mechanical seal is required, the electronic device 30 automatically performs a pressure regulation with possible flowing, alternated with periodic integrity check cycles. Under these operating conditions, block 607 also counts the actual operating hours of the mechanical seal. Independent from the operating status of the electronic device 30 in block 608, all available data and parameters (past and present) can be displayed in real time on the display 319 and are systematically recorded onto the mass storage 321. The block 609 is configured to connect the electronic device 30 with other possible apparata or automated systems. If the mechanical seal operation is not temporarily necessary, it is possible to request, in block 612, the electronic device 30 configuration data variation. In block 614, commands are sent for components 302 and 301 to reset when the system must not operate.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference to their entirety.

What is claimed is:

1. A device for checking and managing the operating and diagnostic conditions of a mechanical seal in a machine, where the device automatically and continuously regulates a first pressure inside the mechanical seal depending on a second measured pressure in the machine in order to keep constant an optimum difference between the first pressure and the second pressure, the device comprising:

a) one or more than one pressure regulator operatively connected on one side to a pressurization line and on another side to a supply line for a fluid for the mechanical seal;

b) one or more than one transducer which detects a measured value of the first pressure in the mechanical seal;

c) one or more than one converter which drives the pressure regulator; and d) one or more than one microprocessor, the microprocessor running a regulating algorithm for the converter, the pressure regulator and the one transducer;

where the regulating algorithm enables the device to perform one or more than one of the following functions:
   i) regulating the first pressure in the mechanical seal detected by the transducer and the second pressure in the machine by comparing the first pressure with a desired pressure setpoint value, the setpoint value being the sum of the second pressure and an optimum set pressure difference recommended by a manufacturer of the mechanical seal;
   ii) regulating a flow-rate of the mechanical seal;
   iii) checking the integrity of the mechanical seal based on detection and evaluation of actual pressure leakage;
   iv) checking for anomalies in the mechanical seal;
   v) counting operating hours of the mechanical seal;
   vi) displaying and recording data for the mechanical seal; and
   vii) interfacing with other apparata or automated systems;

where the pressure regulator comprises a 2-way proportional valve.

2. The device according to claim 1, where the transducer is adapted to measure the pressure in the pressurization line output from the device and the pressure inside the mechanical seal.

3. The device according to claim 1, where the regulating algorithm controls the pressure regulator.

4. The device according to claim 1, further comprising a minimum pressure switch for generating a low pressure alarm, the minimum pressure switch connected between the pressure regulator and the fluid supply line.

5. The device according to claim 1, further comprising means for counting the operating hours of the mechanical seal.

6. The device according to claim 5, where the means for counting the operating hours of the mechanical seal, perform the counting depending on the mechanical seal pressurization pressure and the pressure inside the machine.

7. The device according to claim 1, further comprising means for receiving an output signal allowing other apparata to monitor the operation of the device.

8. The device according to claim 1, further comprising a display and a keyboard for changing operating parameters and for displaying past and present data, and comprises a mass storage for recording the data.

9. The device according to claim 8, where the mass storage is a solid-state mass storage.

10. A method of controlling and managing the operating and diagnostic conditions of a mechanical seal, the method comprising:
   a) providing a device according to claim 1;
   b) connecting the device to the mechanical seal; and
   c) activating the device, thereby controlling and managing the operating and diagnostic conditions of the mechanical seal.

11. A method of controlling and managing the operating and diagnostic conditions of a mechanical seal, the method comprising:
   a) an activation step;
   b) an operation enabling checking step;
   c) an anomalies checking step resulting in the detection of anomalies or the detection of no anomalies, and performed only in case of positive result in step b);
   d) an integrity control request checking step performed only in case of no anomalies detected in the step c);
   e) a pressure regulating step performed only in case of negative check in the step d);
   f) a flowing need checking step;
   g) a flow-rate regulating step bypassed in case of negative check in the step f);
   h) an operating hours counting step;
   i) a data displaying and recording step;
   j) an interfacing step with other systems; and
   k) repeating steps b) through j).

12. The method of claim 11, additionally comprising the following steps in case of a negative check in step b):
   l) a configuration modify request checking step;
   m) a system reconfiguring step bypassed in case of negative check in step l);
   n) a command resetting step;
   o) a data displaying and recording step; and
   p) an interfacing step with other systems.

13. The method of claim 11, additionally comprising the following steps in case of a positive check in step d):
   q) an integrity checking step;
   r) an alarm managing step bypassed in case of no alarms detected in the step q);
   s) an operating hours counting step;
   t) a data displaying and recording step; and
   u) an interfacing step with other systems.

14. The method of claim 11, additionally comprising the following steps in case of the detection of anomalies in step c):
   v) an alarm managing step;
   w) an operating hours counting step;
   x) a data displaying and recording step; and
   y) an interfacing step with other systems.

15. A device for checking and managing the operating and diagnostic conditions of a mechanical seal in a machine, where the device automatically and continuously regulates a first pressure inside the mechanical seal depending on a second measured pressure in the machine in order to keep constant an optimum difference between the first pressure and the second pressure, the device comprising:
   a) one or more than one pressure regulator operatively connected on one side to a pressurization line and on another side to a supply line for a fluid for the mechanical seal;
   b) one or more than one transducer which detects a measured value of the first pressure in the mechanical seal;
   c) one or more than one converter which drives the pressure regulator; and
   d) one or more than one microprocessor, the microprocessor running a regulating algorithm for the converter, the pressure regulator and the one transducer;

where the regulating algorithm enables the device to perform one or more than one of the following functions:
   i) regulating the first pressure in the mechanical seal detected by the transducer and the second pressure in the machine by comparing the first pressure with a desired pressure setpoint value, the setpoint value being the sum of the second pressure and an optimum set pressure difference recommended by a manufacturer of the mechanical seal;
   ii) regulating a flow-rate of the mechanical seal;
   iii) checking the integrity of the mechanical seal based on detection and evaluation of actual pressure leakage;

iv) checking for anomalies in the mechanical seal;
v) counting operating hours of the mechanical seal;
vi) displaying and recording data for the mechanical seal; and
vii) interfacing with other apparata or automated systems;
where the pressure regulator comprises a 3-way proportional valve.

16. The device according to claim 15, where the transducer is adapted to measure the pressure in the pressurization line output from the device and the pressure inside the mechanical seal.

17. The device according to claim 15, where the regulating algorithm controls the pressure regulator.

18. The device according to claim 15, further comprising a minimum pressure switch for generating a low pressure alarm, the minimum pressure switch connected between the pressure regulator and the fluid supply line.

19. The device according to claim 15, further comprising means for counting the operating hours of the mechanical seal.

20. The device according to claim 19, where the means for counting the operating hours of the mechanical seal, perform the counting depending on the mechanical seal pressurization pressure and the pressure inside the machine.

21. The device according to claim 15, further comprising means for receiving an output signal allowing other apparata to monitor the operation of the device.

22. The device according to claim 15, further comprising a display and a keyboard for changing operating parameters and for displaying past and present data, and comprises a mass storage for recording the data.

23. The device according to claim 22, where the mass storage is a solid-state mass storage.

24. A method of controlling and managing the operating and diagnostic conditions of a mechanical seal, the method comprising:
a) providing a device according to claim 15;
b) connecting the device to the mechanical seal; and
c) activating the device, thereby controlling and managing the operating and diagnostic conditions of the mechanical seal.

* * * * *